(12) United States Patent
Milow

(10) Patent No.: US 7,581,794 B1
(45) Date of Patent: Sep. 1, 2009

(54) BICYCLE WHEEL COVERS

(76) Inventor: Kere N. Milow, 3137 W. Dartmouth, Flint, MI (US) 48504

(*) Notice: Subject to any disclaimer, the term of this patent is extended or adjusted under 35 U.S.C. 154(b) by 299 days.

(21) Appl. No.: 11/744,849

(22) Filed: May 5, 2007

Related U.S. Application Data

(60) Provisional application No. 60/798,434, filed on May 5, 2006.

(51) Int. Cl.
*B60B 7/06* (2006.01)
*B60B 7/04* (2006.01)

(52) U.S. Cl. .................... 301/37.102; 301/37.105; 403/353; 403/408.1

(58) Field of Classification Search ........... 301/37.101, 301/37.21, 37.41, 37.105, 37.102, 37.42, 301/37.29, 37.106; 40/587; 403/348, 349, 403/353, 408.1; 411/349, 554, 555; 24/453, 24/580.1, DIG. 41, DIG. 53
See application file for complete search history.

(56) References Cited

U.S. PATENT DOCUMENTS

| | | | | |
|---|---|---|---|---|
| 1,373,889 A | * | 4/1921 | Johnston | ............... 301/37.104 |
| 2,589,028 A | * | 3/1952 | Poupitch | ................... 411/352 |
| 3,004,798 A | | 10/1961 | Tylle | |
| 3,990,131 A | * | 11/1976 | Okamura | ..................... 24/453 |
| 4,293,984 A | * | 10/1981 | Kaufmann, Jr. | ............. 411/553 |
| 4,418,962 A | * | 12/1983 | Schaffer | ................... 301/37.42 |
| 4,682,821 A | | 7/1987 | Strazis | |
| 4,712,838 A | | 12/1987 | Berg et al. | |
| 4,729,604 A | | 3/1988 | Dietz | |
| 4,836,615 A | | 6/1989 | Berg et al. | |
| 4,969,693 A | | 11/1990 | Molson | |
| 4,978,174 A | | 12/1990 | Nosler | |
| 6,793,294 B2 | * | 9/2004 | Shih | ........................ 301/37.41 |
| 6,942,302 B2 | * | 9/2005 | Osterlund et al. | ...... 301/37.105 |
| 7,347,439 B2 | * | 3/2008 | Young et al. | ............. 280/288.4 |

* cited by examiner

*Primary Examiner*—S. Joseph Morano
*Assistant Examiner*—Kip T Kotter
(74) *Attorney, Agent, or Firm*—Robert L. Farris; Farris Law, P.C.

(57) ABSTRACT

Bicycle wheel cover assembly includes two identical flat disks. Each disk includes an outside surface, and inside surface that faces spokes, a radially outer edge surface that fits inside wheel rim radially inner surfaces, and a central bore. A plurality of retainer passages pass through the disk and are spaced from the disk radially outer edge. Retainer assemblies include a tubular retainer member axis that is coaxial with the retainer passage. Each tubular member has an anchored end fixed to the disk and a free end extending away from the disk inside surface. A cam plate is fixed to the free end of each tubular member. Each cam plate has slot, and a retainer groove. A ramp surface extends from the slot to the retainer groove. Each retainer passes through two cam plate slots, cams both disks together and is held in a retainer groove.

5 Claims, 3 Drawing Sheets

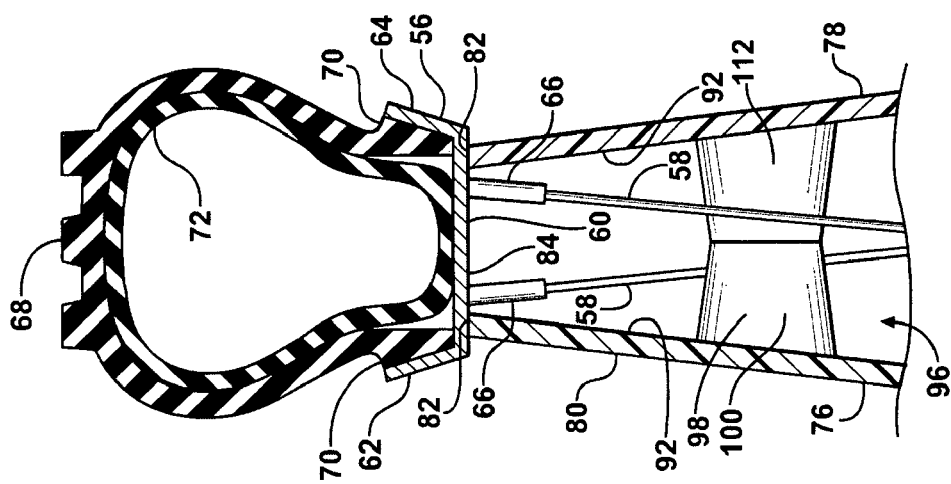
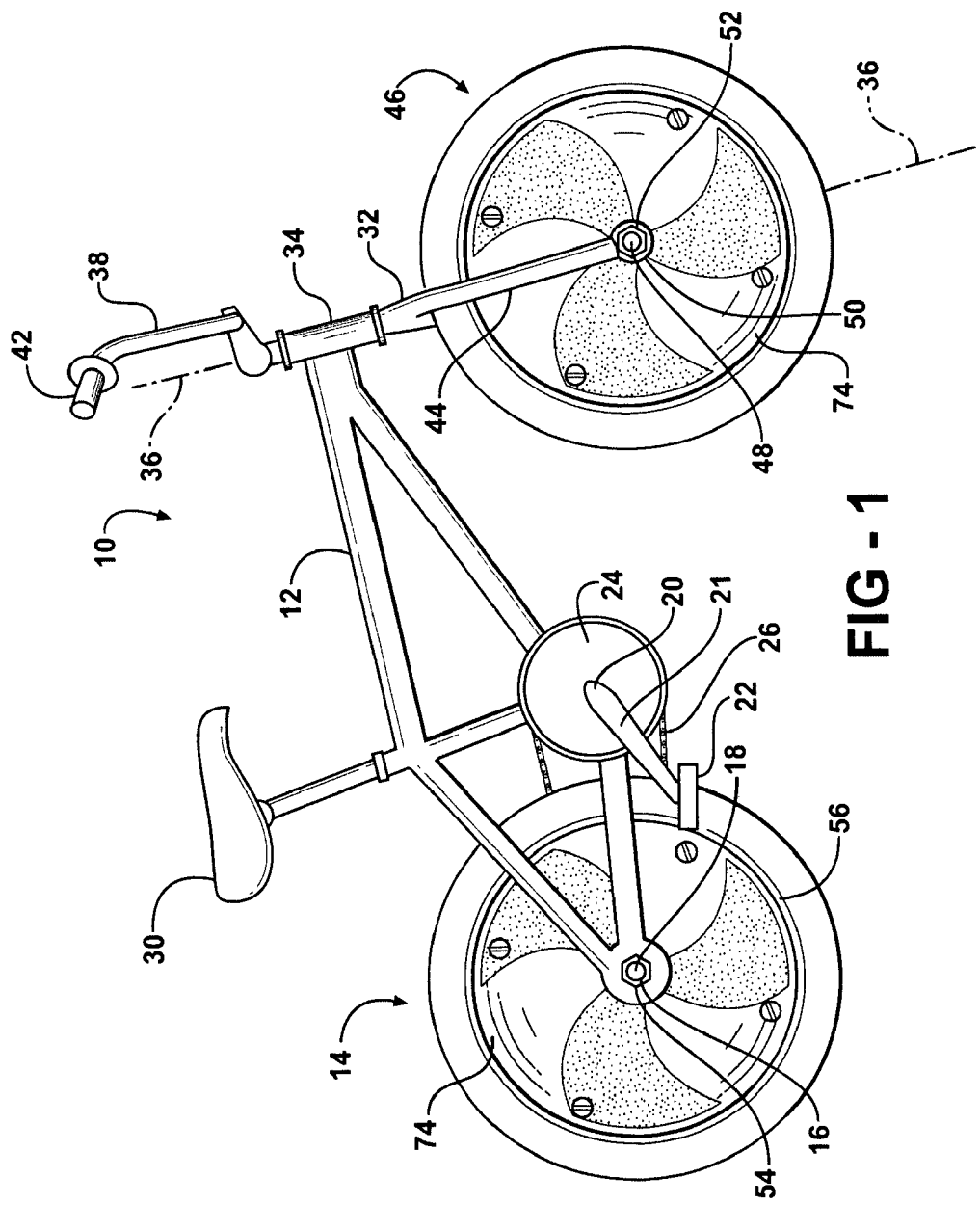

BICYCLE WHEEL COVERS

CROSS REFERENCE TO RELATED APPLICATIONS

This application claims the benefit of the filing date of U.S. Provisional Application No. 60/798,434, titled BICYCLE WHEEL COVERS, FILED May 5, 2006.

TECHNICAL FIELD OF THE INVENTION

The invention relates to a pair of cooperating covers that cover both sides of wheel spokes thereby protecting the spokes, improving aerodynamic efficiency and provide outwardly facing surfaces that may be decorated as desired.

BACKGROUND OF THE INVENTION

Wheel covers for bicycle wheels are well known. Bicycle racers use wheel covers to improve aerodynamics thereby reducing drag. The covers used by racers are often made from light weight materials that are relatively expensive, fragile, difficult to install, and may interfere with brake efficiency. Film such as heat-shrinkable Mylar have been attached to wheel rims by an adhesive and then heated to tighten the film. The axially outward facing wheel rim surfaces that the film is glued to is also contacted by brake pads to decrease speed and stop. The film has a low coefficient of fiction that reduces brake effectiveness. The bake pads that contact the film may also tear the film and destroy the cover.

Special access openings in wheel covers for correcting tire pressure are required. These access openings degrade aerodynamics. Openings adjacent to a wheel rim also weaken the wheel covers and shorten their useful life.

Fabric and plastic materials have been used for bicycle wheel covers. Various hardware components are used to secure these flexible covers to wheels. One system employs ring members with member diameters that are slightly less than the wheel rim diameter. Rubber bands telescopically receive one of the two ring members when a joint in the ring is disconnected. Each of the rubber bands is then pulled through one of a plurality of slots in one wheel cover, between the wheel spokes, through a slot in a second wheel cover and then the second ring member is fed through the rubber bands sequentially. When the second ring member is threaded through all of the bands, and the ring joint is connected, the two wheel covers and the wheel spokes are clamped between the two ring members.

Plastic wheel covers that are relatively rigid have been centered on a wheel axle. A first screw pass through a first cover and screws into the first end of a sleeve positioned between two wheel spokes. A second screw passes through a second cover and screws into the second end of the sleeve positioned between the two wheel spokes. Three more identical sets of first screws sleeves and second screws are spaced around the periphery of the first and second screws. When all of the screws are tightened, the peripheries of the first and second wheel covers are clamped against the sides of the wheel rim and enclose the entire rim. Brakes with brake pads that engage the side of the wheel rim can not be used with these wheel covers.

Molded wheel covers with periphery flanges are known. Radially outward facing surfaces on the flanges engage the wheel rim adjacent to the spokes. Bolts pass through both covers and clamp them together. The heads of the bolts and the nuts are received in recesses in the wheel covers. Tools are required to mount and dismount these molded wheel covers. The outside diameter of the wheel covers corresponds to the radially inner diameter of the wheel rim. Rim design as well as tire size must be considered when making the wheel covers.

SUMMARY OF THE INVENTION

The bicycle wheel cover includes a first flat plastic disk and a second flat plastic disk. The first flat plastic disk has a disk outside surface, a disk inside surface, a disk radially outer edge surface, a disk central bore, and a plurality of retainer passages through the first plastic disk. The retainer passages are spaced apart from each other and spaced radialy inward an equal distance from the disk radially outer edge surface. A plurality of tubular, truncated conical members each have a conical member axis that is coaxial with one of the plurality of retainer passages through the first disk. A large diameter open end of each tubular truncated conical member is fixed to the first flat plastic disk. A small diameter end of each tubular truncated conical member extends inward from the disk inside surface. A cam plate closes the small diameter end of each tubular truncated member. A slot passes through the cam plate member. The slot inboard end is an arc about the conical member axis. The slot extends from the slot inboard end to a slot outboard end. A ramp surface on the cam plate member extends from the slot axially relative to the conical member axis toward the disk outside surface and in an arc about the conical member axis to a radially extending retainer groove in the cam plate member.

The second flat plastic disk includes a second disk outside surface, a second disk inside surface, a second disk radially outer edge surface, a second disk central bore, and a plurality of second disk retainer passages. The retainer passages are spaced apart from each other and are space radially inward an equal distance from the disk radially outer edge surface.

A plurality of second disk tubular truncated conical members, each having a conical member axis that is coaxial with one of the plurality of second disk retainer passages, have a large diameter open end and a small diameter end. The large diameter open end of each truncated conical member is fixed to the second flat plastic disk. The small diameter end of each of the plurality of second disk truncated conical members extends inward from the second disk inside surface. A second disk cam plate member closes the small diameter end of each of the second disk tubular truncated conical members. A second slot passes through the second disk cam plate. The second slot has a slot inboard end that is an arc about the second conical member axis. The second slot extends from the second slot inboard end to a second slot outboard end. A ramp surface on the second disk cam plate member extends from the slot axially relative to the conical member axis toward the second disk outside surface and in an arc about the conical member axis to a radially extending retainer groove in the second cam plate member.

A plurality of retainers each have a shank portion, and a cylindrical portion integral with one end of the shank portion. The cylindrical portion includes an inside surface that is transverse to the shank portion and an outside surface including an engagement surface that facilitates manual rotation of the cylindrical portion. A retainer arm is integral with and extends radially outward from a shank free end. A ramp surface follower on the retainer on the retainer arm has a ramp engaging surface that faces toward the cylindrical portion inside surface of the retainer.

During instillation of the wheel cover, the first flat plastic disk and the second flat plastic disk are positioned adjacent to each other with the first disk tubular truncated conical members and the plurality of second disk tubular truncated conical members projecting toward each other and between wheel spokes. The retainer arm and the shank free end of each of the plurality of retainers extend through the first slot through the first disk cam plate and the second slot through the second disk cam plate in a selected direction. The ramp follower surface is received in one of the first and second retainer holder grooves. The first radially outer edge surface is urged toward the second radially outer edge surface and the first and second flat plastic disks are deformed toward a truncated conical shape. The plurality of retainers also secure the first and second flat plastic disks to each other.

BRIEF DESCRIPTION OF DRAWINGS

These and other objects, features and advantages will become more readily apparent in view of the following detailed description and best mode, and accompanying drawings, in which:

FIG. 1 is a side elevational view of a bicycle with wheel covers;

FIG. 2 is an enlarged sectional view of a wheel in a radial plane including the wheel axis of rotation;

DETAILED DESCRIPTION OF THE PREFERRED EMBODIMENTS

Figure 3:
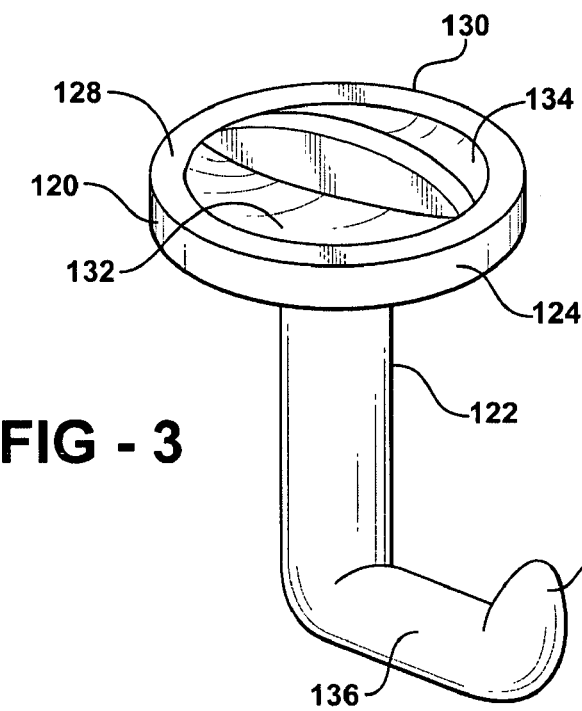
FIG. 3 is a perspective view of a fastener for attaching two wheel covers to a wheel with spokes.
Figure 4:
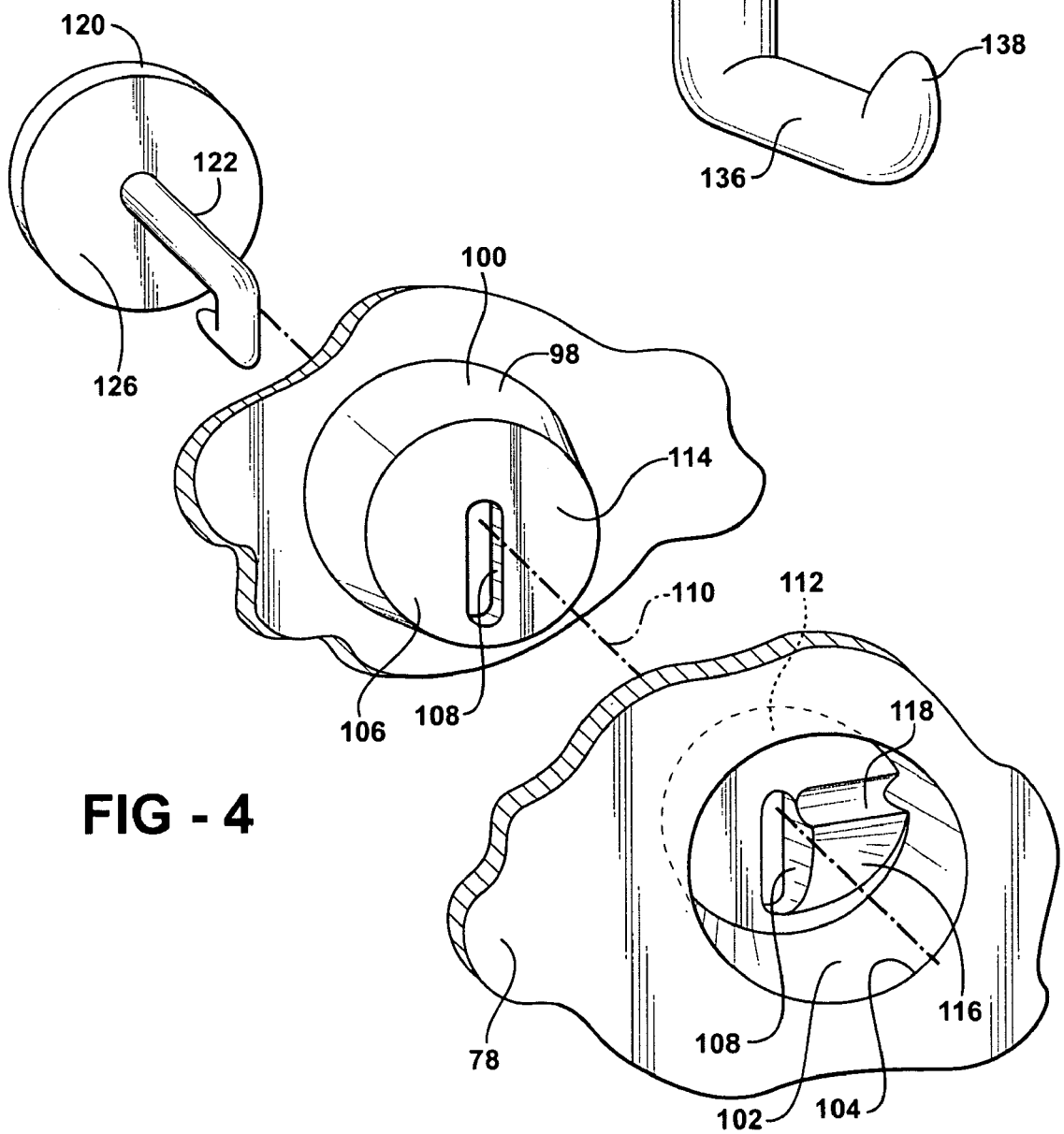
FIG. 4 is an expanded perspective view of a fastener and two wheel covers, with parts broken away, in alignment for being clamped together.

The bicycle 10 has a frame 12, a rear wheel assembly 14 journaled on an axle 16 for rotation about a transverse horizontal axis 18. A crank 20 includes a left pedal (not shown) and a right pedal 22 journaled on the ends of crank arms 21. A drive sprocket 24 is mounted on the crank 20. A drive chain 26 is trained around the drive sprocket 24 and a driven sprocket on the rear wheel assembly 14. A seat assembly 30 is clamped to the frame 12 in a selected vertical position relative to the crank 20.

A fork 32 is journaled in a tube 34 for pivotal movement about a steering axis 36 that extends upward and rearwardly. The tube 34 is an integral member of the frame 12. A steering handle bar 38 is clamped to the top of the fork 32. A left side handgrip (not shown) and a right hand grip 42 are mounted on the handle bar 38. A right leg (not shown) and a left leg 44 are integral parts of the fork 32. A front wheel assembly 46 is journaled on a front axle 48 for pivotal movement about a transverse horizontal axis 50. The front axle 48 is clamped to the lower ends of the legs 44 of the fork 32 by nuts 52. The rear axle 16 is clamped to the rear of the frame 12 by a pair of nuts 54. The axles 16 and 48 are fixed relative to the frame 12 and the fork 32 respectively. Wheel hubs (not shown) of the wheel assemblies 14 and 46 are journaled on the axles 16 and 48.

The wheel assemblies 14 and 46 are substantially identical. Both wheel assemblies 14 and 46 include a steel rim 56. The rim 56 includes a center ring portion 60 that is continuous and radially outward extending flanges 62 and 64 on both sides. A plurality of spokes 58 are connected to the center ring portion 60 of the rim 56 and to the wheel hub. A nipple 66 is rotatably retained in the bores through the center ring portion 60 and screw onto a threaded end of each steel wire spoke 58. The nipples 66 are rotated to tension the spokes 58 and to hold the rim flanges 62 and 64 parallel to a plane transverse to the axis 18 or 50 of rotation of the wheel assemblies 14 or 46. Tires 68 with beads 70 are received between the flanges 62 and 64 of the steel rim 56. An inflatable donut shaped tube 72 is inserted into the tire 68 and inflated.

A wheel cover assembly 74 is mounted on each wheel assembly 14 and 46. Each wheel cover assembly 74 includes a first disk 76 and a second disk 78 that are substantially identical. Both disks 76 and 78 include a flat plate 80 with a circular radially outward facing surface 82 on the disk outer edge. The plate 80 is preferably a semi rigid plastic. The radially outward facing surface 82 faces a radially inward facing surface 84 on the center ring portion 60 of the rim 56. The disk surface 82 can engage the surface 84 to center the plate 80 relative to an axis 18 or 50 of rotation of each wheel assembly 14 or 46. The disk plate 80 should be centered in the rim 56 for balance. However, the plate 80 can be smaller in diameter than the surface 84 on the rim 56. Three small wedges can be used to center the plate 80 relative to the rim 56.

A central bore 86 is provided in the center of the first disk 76 and the second disk 78. The diameter of the center bore 86 is sufficiently large to provide clearance for the wheel bearing adjusters and the wheel attachment washer retainers and clamp members such as nuts 52 and 54 that are or may be employed on a bicycle 10. The central bore 86 is larger than the diameter of the axle 16 or 48. For most bicycles, a central bore 86 with a two inch diameter is satisfactory.

A slot 88 in each plate 80 extends from the central bore 86 to the outward facing surface 82. The slot 88 makes it possible to mount the disks 76 and 78 on the wheels 14 and 46 of a bicycle while mounted on the frame 12 or fork 32. The nuts 54 clamp the rear axle 16 to the frame 12 while the disks 76 and 78 are positioned on the rear wheel 14. The nuts 52 clamp the front axle 48 to the fork 32 while the disks 76 and 78 are positioned on the front wheel 46. The slot 88 can be eliminated if the wheels 14 and 46 are removed from bicycles for wheel cover assembly 74 mounting.

Figure 5:
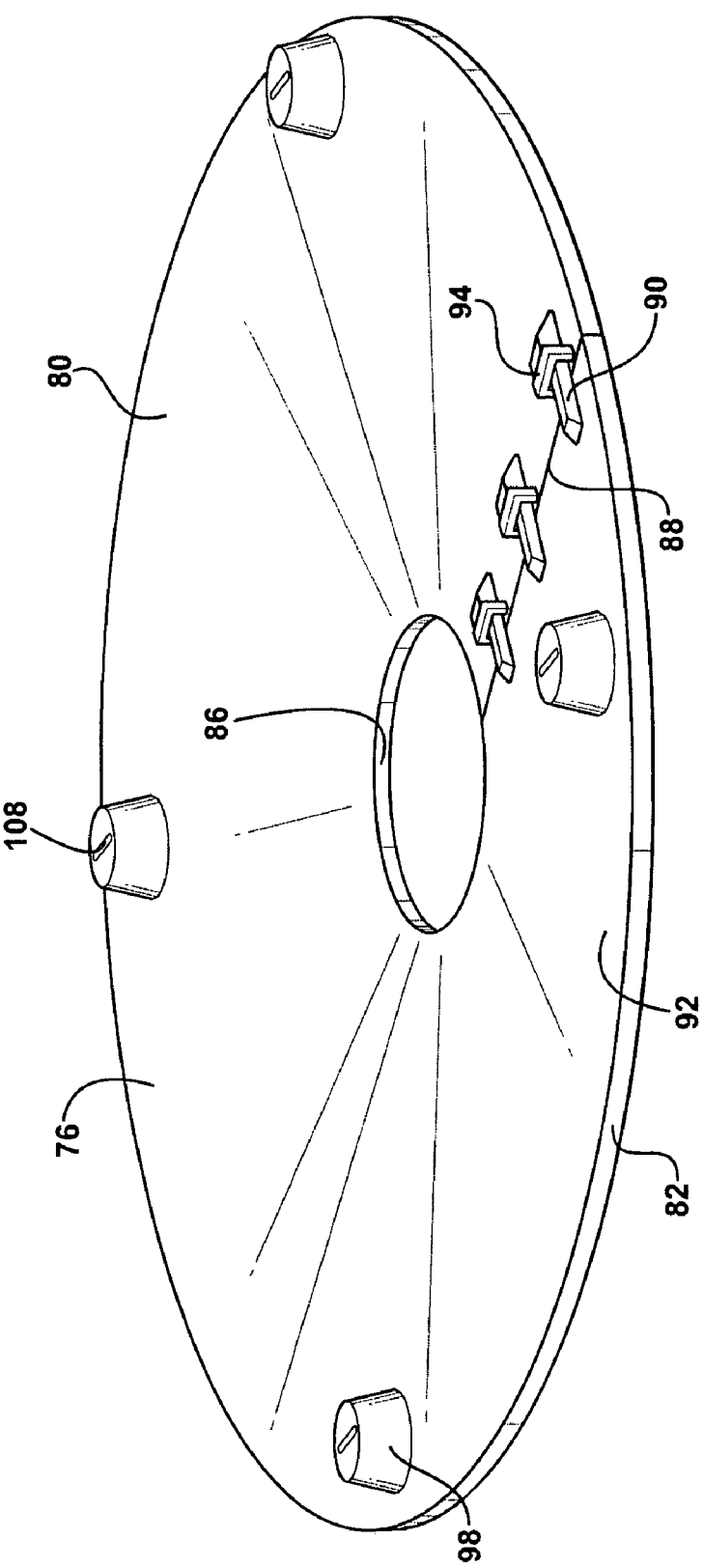
FIG. 5 is an enlarged perspective view of the inside of one wheel cover.

A bar 90 is fixed to an inside surface 92 on one side of the slot 88. A free end of the bar 90 extends into a receiver 94 on the opposite side of the slot 88 from the bar attachment. The receiver 94 is fixed to the inside surface 92 on the opposite side of the slot 88 from the attachment of the bar 90. The bar 90 cooperates with the receiver 94 to hold the disk inside surface 92 adjacent to both sides of the slot 88 in a common plane. The bar 90 and receiver 94 also holds the disk outside surface 93 adjacent to both sides of the slot 88 in a common plane. The bar 90 extends into the receiver 94 a short distance only making it possible to deform the disk 76 or 78 and align the bar 90 with the receiver 94. Three sets of receiver 94 and bars 90 are shown in FIG. 5. The number of sets of receivers and bars 90 can be increased or decreased as required to hold the disk inside surface 92 adjacent to both sides of the slot 88 in a common plane. The disk inside surface 92 faces the wheel spokes 58 and contacts portions of the spokes. The disk inside surface 92 may also contact the spoke nipples 66.

Four pairs of disk retainer assemblies 96 are employed to clamp the first disk 76 and the second disk 78 to one wheel 14 or 46 and to each other. Each pair of disk retainer assemblies 96 has a first truncated conical member 98. The first conical member 98 is hollow, has a conical outside surface 100 and a conical inside surface 102. The large diameter end is fixed to a disk inside surface 92 and covers a conical passage 104 through the first disk 76. The small diameter end of the first conical member 98 is closed by a plate member 106. The plate member 106 has an elongated slot 108. One end of the slot 108 is an arc about the axis 110 of the conical member 98.

The second truncated conical member 112 is substantially identical to the first truncated conical member 98. The same reference numbers are used to identify portions of the truncated conical members that are identical. The second conical member 112 is hollow, has a conical outside surface 100 and a conical inside surface 102. The large diameter end is fixed to a disk inside surface 92 and covers a conical passage 104 through the second disk 78. The small diameter end of the second conical member 98 is closed by a plate member 106. The plate member 106 has an elongated slot 108. One end of the slot 108 is an arc about the axis 110 of the conical member 112. The plate member 106 on the second conical member 112 has disk retainer stop surface 114 that may be forced into engagement with a disk retainer stop surface 114 on the first truncated conical member 98 when mounted on a wheel assembly 14 and 46.

The surface of the plate member 106 inside the first and second conical member 98 and 112 includes a ramp surface 116 and a retainer-locking groove 118.

A j-shaped retainer 120 has a shank portion 122. A cylindrical portion 124 is integral with an upper end of the shank portion 122. The cylindrical portion 124 has an inside surface 126 that is transverse to the shank portion 122. An outside surface 128 of the cylindrical portion 124 includes a handle member 130 with recesses 132 and 134 on both sides. The recesses permit the handle member 130 to be grasped between a person's thumb and a finger to rotate the retainer 120 about the axis of the shank 122. An arm 136 extends radially outward from the lower end of the shank portion 122. A cam surface follower 138 extends, from the free end of the arm 136, toward the cylindrical portion 124 and generally parallel to the shank portion.

After the first disk 76 and the second disk 78 are positioned on opposite sides of a wheel assembly 14 or 46 with the first truncated conical member 98 extending between wheel spokes 58 and the second truncated conical member 112 extending between the same wheel spokes, the elongated slots 108 in the first and second truncated conical members are aligned with each other. The cam surface follower 138, the arm 136, and the lower end of the shank 122 are inserted through the two aligned elongated slots 108. The handle member 130 is manually turned to rotate the shank 122. Rotation of the shank 122 moves the cam surface follower 138 up the ramp surface 116 and cams the disk retainer stop surfaces 114 on first and second truncated conical members 98 and 112 toward each other. The cam surface follower 138 drops into the retainer holder groove 118 and the stop surfaces 114 on both conical members 98 and 112 are held in engagement with each other. The inside surface 126 of the retainer 120 slides along the upper portion of the ramp surface 116 in one of the first and second truncated conical members 98 or 112 as the cam surface follower 138 moves along the ramp surface 116 in the other truncated conical member until the cam surface follower 138 is received in the retainer holder groove 118. The J-shaped retainer 120 is rotated with increased torque to move the cam surface follower out of the retainer holder groove 118 and release the connection between two conical members. The J-shaped retainer 120 can be inserted through two aligned elongated slots 108 from either side of a wheel.

There are four disk retainer assemblies 96 as shown in FIG. 1. The number of the retainer assemblies 96 can be increased or decreased as required. The disk retainer assemblies are described above as having truncated conical members 98 or 112 that are tubular. These conical tubes 98 and 112 can be cylindrical if desired.

The first and second disks 76 and 78 can be injection molded as one piece. The disks can also be fabricated employing disks 76 and 78 cut from flat sheet material, and molded conical members 98 and 112 that are attached to the disks by adhesives. The bars 90 and receivers 94 are also attached to the disks 76 and 78 by adhesives. If the molded conical members 98 and 112 are cylindrical tubes rather than conical, the entire wheel cover assembly 74 can be fabricated rather than molded.

The decorations on the outside surfaces 93 of flat plastic plates may include logos of schools, sports teams, and companies. Reflective materials can be attached to the outside surface 93. Tubes with liquids with and various densities can be attached to he outside surface 93. Even whistles can be attached or formed in the flat plates. Apertures may also be cut through the plates.

I claim:

1. A bicycle wheel cover comprising:
   a first flat plastic disk including a first disk outside surface, a first disk inside surface, a first disk radially outer edge surface, a first disk central bore, and a plurality of first disk retainer passages through the first flat plastic disk spaced apart from each other and spaced radially inward an equal distance from the first disk radially outer edge surface;
   a plurality of first tubular retainer members each of which has a first tubular member axis, that is coaxial with one of the plurality of first disk retainer passages, has an anchored end fixed to the first flat plastic disk, extends away from the first disk inside surface and has a first tubular retainer free end;
   a plurality of first cam plates each of which is fixed to the first tubular retainer free end of one of the plurality of first tubular retainer members, a first slot passing through each of the first cam plates, a ramp surface on each of the first cam plates that extends from an edge of the first slot axially, relative to the tubular member axis, toward the anchored end to the first plastic disk and to a first retainer holder groove in the first cam plate;
   a second flat plastic disk including a second disk outside surface, a second disk inside surface, a second disk radially outer edge surface, a second disk central bore, and a plurality of second disk retainer passages through the second flat plastic disk spaced apart from each other and spaced radially inward and equal distance from the second disk radially outer edge surface;
   a plurality of second tubular retainer members each of which has a second tubular member axis, that is coaxial with one of the plurality of second disk retainer passages, has an anchored end fixed to the second flat plastic disk, extends away from the second disk inside surface and has a second tubular retainer free end;
   a plurality of second cam plates each of which is fixed to the second tubular retainer free end of one of the plurality of second tubular retainer members, a second slot passing through each of the second cam plates, a ramp surface on each of the second cam plates that extends from an edge of the second slot axially, relative to the tubular member axis, toward the anchored end fixed to the second flat plastic disk and to a second retainer holder groove in the second cam plate;
   a plurality of J-shaped retainers each of which has a shank portion, a cylindrical portion integral with one end of the shank portion, a retainer arm integral with a shank free end of the shank portion and a ramp follower surface on the retainer arm; and wherein during use, the retainer arm and the shank free end of each of the plurality of retainers extends through the first slot and the second slot in a selected direction, the ramp follower surface is received in one of the first and second retainer holder grooves, cams the first radially outer edge surface toward the second radially outer edge surface, deform the first and second flat plastic disks toward a truncated conical shape and secures the first and second flat plastic disks to each other.

2. A bicycle wheel cover, as set forth in claim 1, including a first disk slot in the first flat plastic disk extending from the first disk central bore to the first disk radially outer edge;

a second disk slot in the first flat plastic disk extending from the second disk central bore to the second disk radially outer edge; and wherein the first disk slot and the second disk slot permit mounting of the bicycle wheel cover on wheels while mounted on bicycles.

3. A bicycle wheel cover, as set forth in claim 2 including:

at least one first disk receiver secured to the first disk inside surface, of the first flat plastic disk, adjacent to a slot first site, and at least one first disk bar secured to the first disk inside surface, of the first flat plastic disk, adjacent to a first slot second side and receivable in the at least one first disk receiver to hold the first slot first side in alignment with the first slot second side, and at least one second disk receiver secured to the second disk inside surface, of the second flat plastic disk, adjacent to a second slot first side, and at least one second disk bar secured to the second disk inside surface, of the second flat plastic disk, adjacent to a second slot second side and receivable in the at least one second disk receiver to hold the second slot first side in alignment with the second slot second side.

4. A bicycle wheel cover comprising:

a first flat plastic disk including a disk outside surface, a disk inside surface, a disk radially outer edge surface, a disk central bore, and a plurality of retainer passages through the first plastic disk spaced apart from each other and spaced radially inward an equal distance from the disk radially outer edge surface;

a plurality of tubular, truncated conical members each of which has a conical member axis that is coaxial with one of the plurality of retainer passages through the first disk, a large diameter open end of each tubular truncated conical member fixed to the first flat plastic disk, a small diameter end of each tubular truncated conical member extending inward from the disk inside surface, a cam plate member closing the small diameter end of each tubular truncated member and having a slot passing through the cam plate member with a slot inboard end that is an arc about the conical member axis and wherein the slot extends from the slot inboard end to a slot outboard end, a ramp surface on the cam plate member extending from the slot axially relative to the conical member axis toward the disk outside surface and in an arc about the conical member axis to a radially extending retainer groove in the cam plate member;

a second flat plastic disk including a second disk outside surface, a second disk inside surface, a second disk radially outer edge surface, a second disk central bore, and a plurality of second disk retainer passages through the second plastic disk spaced apart from each other and spaced radially inward an equal distance from the disk radially outer edge surface;

a plurality of second disk tubular truncated conical members each of which has a conical member axis that is coaxial with one of the plurality of second disk retainer passages through the second disk, a large diameter open end of each of the truncated conical member fixed to the second flat plastic disk, a small diameter end of each of the plurality of second disk truncated conical members extending inward from the second disk inside surface, a second disk cam plate member closing the small diameter end of each of the second disk tubular truncated conical members and having a second slot passing through the second disk cam plate member with a second slot inboard end that is an arc about the second conical member axis and wherein the second slot extends from the second slot inboard end to a second slot outboard end, a ramp surface on the second disk cam plate member extending from second the slot axially relative to the conical member axis toward the second disk outside surface and in an arc about the conical member axis to a radially extending retainer groove in the second cam plate member;

a plurality of J-shaped retainers each of which includes a shank portion, a cylindrical portion integral with one end of the shank portion, a cylindrical portion inside surface that is transverse to the shank portion, an outside surface of the cylindrical portion including an engagement surface that facilitates manual rotation of the cylindrical potion, a retainer arm integral with and extending radially outward from a shank free end of the shank portion, a ramp surface follower on the retainer arm with a ramp engaging surface that faces toward the cylindrical portion inside surface of the retainer; and wherein the first flat plastic disk and the second flat plastic disk are position adjacent to each other with the plurality of first disk tubular truncated conical members and the plurality of second disk tubular truncated conical members projecting toward each other and between wheel spokes, the retainer arm and the shank free end of each of the plurality of retainers extends through the first slot through the first disk cam plate and the second slot through the second disk cam plate in a selected direction, the ramp follower surface is received in one of the first and second retainer holder grooves, the first radially outer edge surface urged toward the second radially outer edge surface and deform the first and second flat plastic disks toward a truncated conical shape, and secure the first and second flat plastic disks to each other.

5. A bicycle wheel cover, as set forth in claim 4, wherein the disk central bore in the first flat plastic disk has a first disk bore diameter of at least two inches, and wherein the second disk central bore in the second flat plastic disk has a second disk bore diameter of at least two inches.

* * * * *